(12) United States Patent
Parrinello et al.

(10) Patent No.: US 12,214,539 B2
(45) Date of Patent: Feb. 4, 2025

(54) DEVICE AND A METHOD FOR FORMING AN OBJECT MADE OF A POLYMERIC MATERIAL THROUGH THE BLOWING OF AIR INTO A TUBULAR BODY

(71) Applicant: SACMI COOPERATIVA MECCANICI IMOLA SOCIETA' COOPERATIVA, Imola (IT)

(72) Inventors: Fiorenzo Parrinello, Medicina (IT); Fabrizio Pucci, Castel Guelfo di Bologna (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 715 days.

(21) Appl. No.: 16/307,763

(22) PCT Filed: Jun. 20, 2017

(86) PCT No.: PCT/IB2017/053647
§ 371 (c)(1),
(2) Date: Dec. 6, 2018

(87) PCT Pub. No.: WO2018/025100
PCT Pub. Date: Feb. 8, 2018

(65) Prior Publication Data
US 2019/0263045 A1    Aug. 29, 2019

(30) Foreign Application Priority Data

Aug. 5, 2016   (IT) ..................... 102016000083036

(51) Int. Cl.
*B29C 49/22* (2006.01)
*B29C 48/84* (2019.01)
(Continued)

(52) U.S. Cl.
CPC ............. *B29C 49/22* (2013.01); *B29C 48/845* (2019.02); *B29C 48/87* (2019.02); *B29C 49/04* (2013.01)

(58) Field of Classification Search
CPC ....... B29C 49/22; B29C 48/845; B29C 48/87; B29C 49/04; B29C 48/32; B29C 48/09;
(Continued)

(56) References Cited

U.S. PATENT DOCUMENTS

| 2,736,064 A | 2/1956 | Rubin | |
| 3,702,226 A * | 11/1972 | Kim et al. | ............. B29C 48/86 |
| | | | 425/326.1 |

(Continued)

FOREIGN PATENT DOCUMENTS

| DE | 2338236 A1 * | 1/1974 | ............. B29C 48/09 |
| DE | 2451263 A1 | 5/1975 | |

(Continued)

OTHER PUBLICATIONS

English translation of DE-2338236-A1—(1) abstract, (2) specification, by EPO. (Year: 2010).*

(Continued)

*Primary Examiner* — Xiao S Zhao
*Assistant Examiner* — Inja Song
(74) *Attorney, Agent, or Firm* — Chrisman Gallo Tochtrop LLC (57) ABSTRACT

A method for forming an object made of a polymeric material, wherein the polymeric material has a melting temperature (Tf), comprising the following steps: melting the polymeric material; cooling the polymeric material below the melting temperature (Tf); extruding the polymeric material into a tubular shaped body (H); inserting the tubular body (H) into a mould (60) having an internal cavity; closing off the tubular body (H) at a first end thereof; blowing air (Continued)

into the tubular body (H) through a second end, in order that the tubular body (H) adheres to the internal cavity of the mould (60).

9 Claims, 6 Drawing Sheets

(51) Int. Cl.
*B29C 48/87* (2019.01)
*B29C 49/04* (2006.01)

(58) Field of Classification Search
CPC ......... B29C 48/30; B29C 48/34; B29C 48/86; B29C 48/865; B29C 48/10; B29C 48/0017; B29C 49/04116; B65D 1/0215
See application file for complete search history.

(56) References Cited

U.S. PATENT DOCUMENTS

| | | | | |
|---|---|---|---|---|
| 4,216,253 A * | 8/1980 | Bonnebat | ................ | B29C 48/32 |
| | | | | 428/36.92 |
| 5,840,223 A * | 11/1998 | Feuerherm | .............. | B29C 49/78 |
| | | | | 264/40.1 |
| 5,840,232 A * | 11/1998 | La Belle | ................ | B29C 48/10 |
| | | | | 425/467 |
| 2005/0129888 A1 | 6/2005 | Kwon | | |
| 2013/0059102 A1 * | 3/2013 | Torchio | .................. | B29C 48/92 |
| | | | | 264/540 |
| 2015/0087733 A1 * | 3/2015 | Heusser | ................ | B29C 48/515 |
| | | | | 521/79 |
| 2018/0093408 A1 * | 4/2018 | Sun | ..................... | B29C 48/0017 |

FOREIGN PATENT DOCUMENTS

| | | | |
|---|---|---|---|
| GB | 947255 | A | 1/1964 |
| GB | 1423788 | A | 2/1976 |
| JP | S5032259 | A | 3/1975 |
| JP | S51100163 | A | 9/1976 |
| JP | 2006168290 | A | 6/2006 |
| WO | 2010110420 | A1 | 9/2010 |

OTHER PUBLICATIONS

A blog, by Golriz "Bottle Grade PET," available at http://www.golrizpet.com/en/BottlegradePET.aspx, published on Oct. 4, 2010. (Year: 2010).*

A proof of publication date of the blog, by Golriz "Bottle Grade PET." (Year: 2010).*

English translation of DE-2338236-A1—(1) abstract, (2) specification, by EPO was attached as OA. Appendix mailed on Sep. 9, 2021. (Year: 2010).*

* cited by examiner

DEVICE AND A METHOD FOR FORMING AN OBJECT MADE OF A POLYMERIC MATERIAL THROUGH THE BLOWING OF AIR INTO A TUBULAR BODY

FIELD OF THE INVENTION

The present invention relates to a device and a method for forming an object made of a polymeric material through the blowing of air into a tubular body.

DESCRIPTION OF RELATED ART

The polymeric material, processable by means of the method and the device according to the invention, can be any material used in forming processes for blow moulding of an extruded tubular body, processes being also known under the wording "Extrusion Blow Moulding" (EBM), in particular a semi-crystalline material such as polypropylene (PP), high-density polyethylene (HDPE) or polyethylene terephthalate (PET). More generally, the method and the device according to the invention can be used to process any polymeric material with a melting temperature higher than its crystallization and/or glass-transition temperature.

EBM processes basically entail melting a polymeric material within a melting device or extruder. The extruder is connected to an extrusion head, which is structured so as to extrude the polymeric material into a tubular shaped body, also called "parison". The molten polymeric material, driven by the extruder, flows along the extrusion head and comes out in the form of a tubular body. A mould, having an internal cavity which reproduces in negative the shape of the container, receives the tubular body from the extrusion head. Typically, the mould is split into two half-moulds which are movable together between an open position, in which the half-moulds are mutually apart, and a closed position, in which the half-moulds abut each other. The tubular body is disposed between the two half-moulds while these are in the open position thereof. Subsequently, the two half-moulds move into their closed position. The two half moulds are provided with a cutting edge, which, in the closed position, cuts an end portion of the tubular body, thereby closing off the tubular body itself. The other end of the tubular body instead remains open concentrically with the core of the extrusion head. The mould is provided with an opening, configured to accommodate the open end of the tubular body and the core of the extrusion head. Following the closing of the mould, a certain amount of air is blown inside the tubular body through the core of the extrusion head. This causes inflation of the tubular body, which adheres to the mould cavity, thus taking on the shape thereof. Following solidification of the polymeric material, the formed container is removed from the mould.

The EBM processes currently available, and the machinery for implementing them, can be significantly improved both as regards the production cycle time, and as regards the characteristics of the products obtained.

In fact, the polymeric material is inserted into the mould in the form of a tubular body at a relatively high temperature that is higher than the melting temperature. This implies that prior to extracting the product from the mould it is necessary to wait a relatively long time for the polymeric material to become solidified.

Furthermore, the characteristics of the polymeric material obtained in the solidified state are adversely affected by the crystallization of the material itself, which takes place too quickly and in an uncontrolled manner.

It is an object of the present invention to provide a method and a device for forming an object made of polymeric material through the blowing of a tubular body which allow the drawbacks of the prior art to be overcome.

An advantage of the present invention is that it allows production cycle times to be drastically reduced.

A further advantage of the invention is that it can significantly improve the mechanical properties of the products obtained.

Another advantage is that of being able to work with materials that are usually too fluid, like conventional PET for bottles. Such materials, advantageously cheap, deform excessively during formation of the tubular body or parison.

A further advantage of the present invention is that of also being applicable to EBM processes which provide for the extrusion of two or more mutually concentric tubular bodies, such as, for example, a multi-layer.

A further advantage is that a colder material, which is thus more rigid and viscous, is easier to cut due to the greater resistance opposed to the blades, the lower deformability and the lower adhesiveness.

A lower adhesiveness also permits simplification of the equipment since, for example, it is not required to apply any surface treatments or anti-adhesive coatings.

BRIEF DESCRIPTION OF THE DRAWINGS

Further characteristics and advantages of the present invention will better emerge from the detailed description that follows of a preferred embodiment of the invention, illustrated by way of non-limiting example in the appended figures, wherein.

DETAILED DESCRIPTION OF PREFERRED EMBODIMENTS OF THE INVENTION

The object produced by means of the device 1 may be a container, such as a bottle, or any other object having a cavity.

The polymeric material used by the device 1 can be any kind of polymeric material, in particular a semi-crystalline material such as polypropylene (PP), high-density polyethylene (HDPE) or polyethylene terephthalate (PET).

Semi-crystalline materials are materials that, in solid form, exhibit a crystalline mass fraction and an amorphous fraction.

For semi-crystalline polymeric materials, it is possible to identify a melting temperature Tf and a crystallization temperature Tc.

In particular, the melting temperature Tf is the temperature at which a polymeric material that is heated passes from a solid state to a molten state.

The crystallization temperature Tc is the temperature at which a fraction of the material crystallizes during cooling. The crystallization temperature Tc is lower than the melting temperature Tf.

To be more precise, the process of crystallization does not occur at a specific temperature, but in a temperature range defined between a crystallization start temperature Tic and a crystallization end temperature Tfc.

Furthermore, the crystallization temperature Tc, as well as the difference between the crystallization start temperature Tic and the crystallization end temperature Tfc, are not constant for a given material, but depend on the conditions under which the material is cooled. In particular, the lower the temperature at which the molten polymeric material is maintained, the faster the crystallization. Moreover, the more quickly the molten polymeric material is moved, the more it will lower the temperature range at which crystallization occurs.

Figure 2:
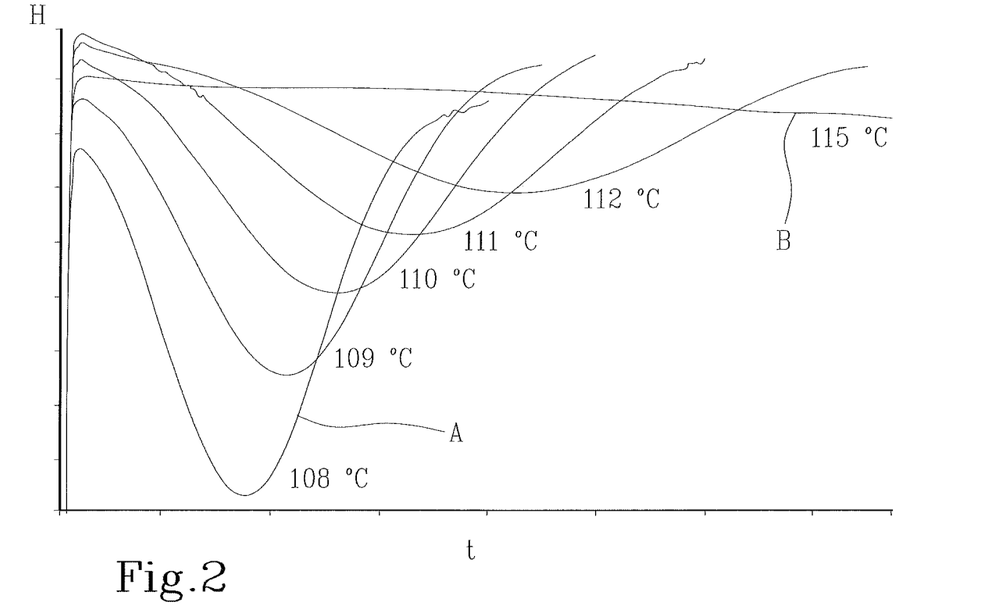
FIG. 2 is a graph showing how the crystallization of a particular type of polypropylene varies as a function of time.

This is confirmed by FIG. 2, which shows the results of an analysis carried out on polypropylene samples via differential scanning calorimetry (DSC). The samples of analyzed material were brought to a higher temperature than the melting temperature and kept there for a few minutes so as to melt all the crystals present therein. Subsequently, the samples were cooled to a preset temperature and maintained at that temperature for a time necessary to obtain the crystallization of each sample. Thus, in this way, the timing and crystallization mode for each sample were assessed.

FIG. 2 shows the energy released from the samples analyzed as a function of time during the crystallization phase.

In particular, the curve indicated by A is that of the sample which was cooled to the lowest temperature, equal to 108° C. In this sample, the crystallization occurred in less time and within a lower temperature range than the other samples analyzed. Curve A shows an exothermic peak of crystallization which is the narrowest among all the analyzed samples. This means that the difference between the crystallization start temperature Tic and the crystallization end temperature Tfc is minimum for that sample compared to all other samples analyzed.

The curve indicated by B instead relates to the sample which was cooled at the highest temperature, i.e. 115° C. In this sample no crystallization occurred, because the high temperature at which the sample was maintained did not enable the formation of crystals during the time period in which the sample was observed.

This shows that, with the temperature being maintained lower, the polymeric material crystallizes faster.

Figure 7:
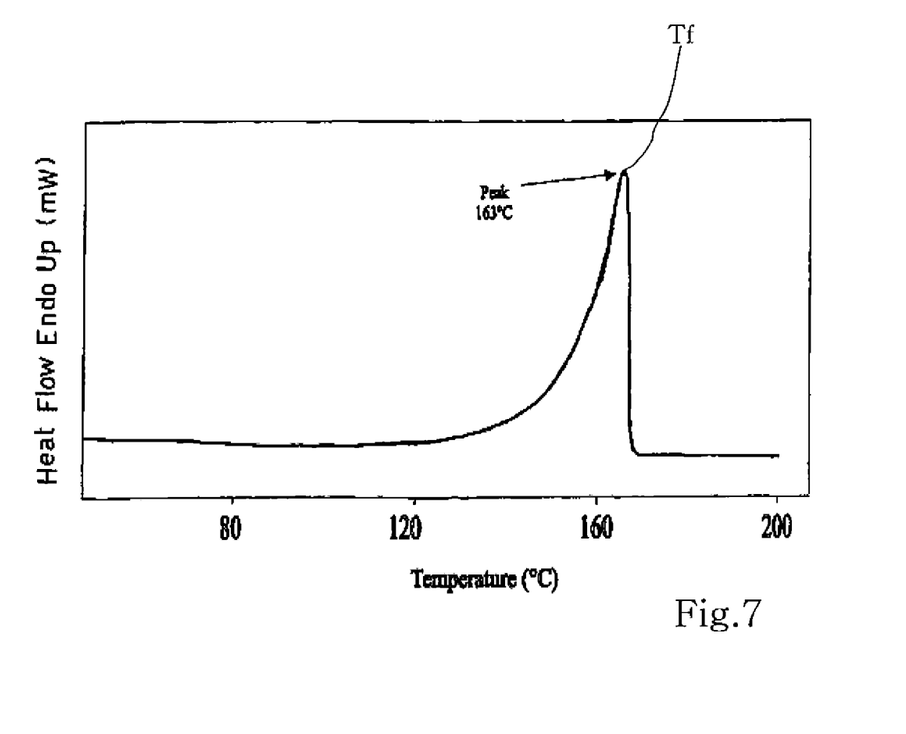
FIGS. 7 and 8 respectively show the melting temperatures Tf and crystallization temperatures Tc for a polypropylene measured with a DSC method of analysis.
Figure 8:
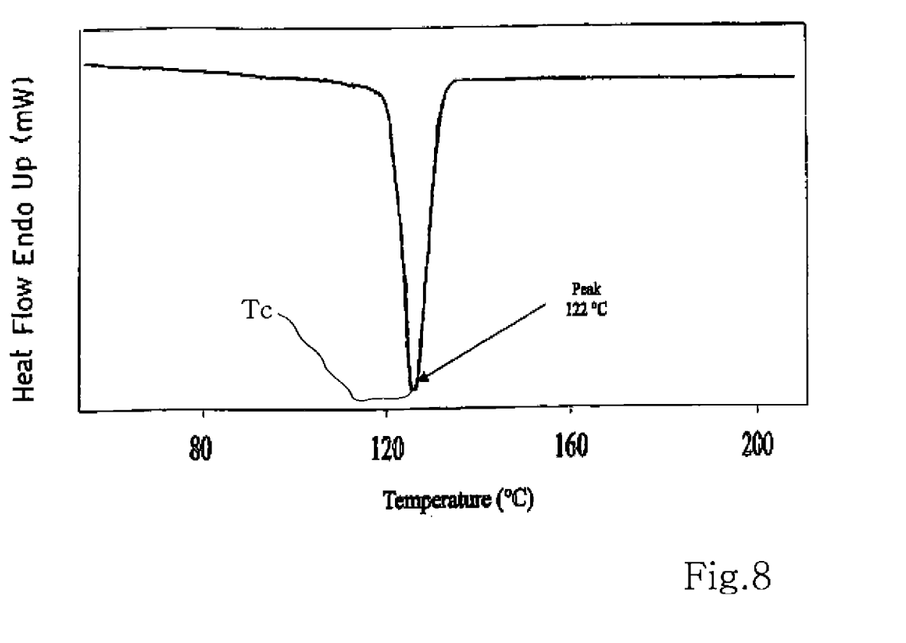

FIGS. 7 and 8 respectively show the melting temperatures Tf and crystallization temperatures Tc for a polypropylene, measured with a DSC method of analysis as a function of the heat required by the material. It should be appreciated that for the polypropylene analyzed there exists a temperature difference of about 40°.

Given all this, it is to be noted that in the course of the following description reference will simply be made to the crystallization temperature Tc, to be understood as any temperature between the crystallization start temperature Tic and the crystallization end temperature Tfc.

A similar reasoning applies to the melting process and melting temperature thereto related.

Figure 3:
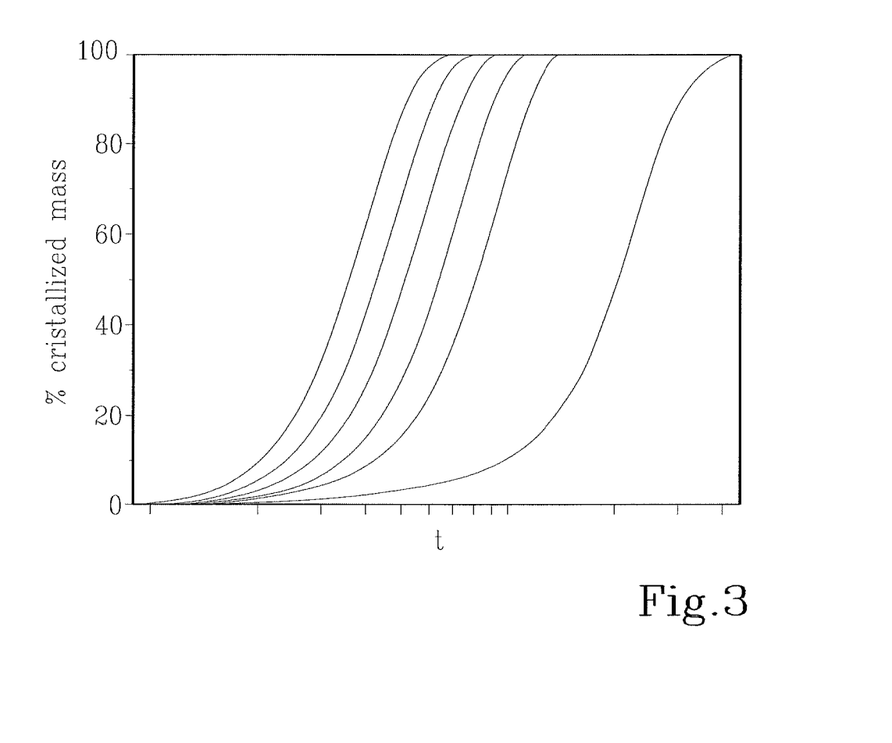
FIG. 3 is a graph showing, for the polypropylene of FIG. 2, how the percentage of crystallized mass varies as a function of time.

FIG. 3, constructed based on the data obtained from FIG. 2, shows how the percentage of crystallized mass varies in a sample as a function of time. Each curve relates to a different temperature to which the sample was cooled, after which the sample temperature was kept constant. In particular, the temperature of each sample increases as one moves from left to right in the graph. It is noted that the lower the temperature at which the sample is cooled, the more the time required in order for 100% of the sample mass to become crystallized is reduced.

Figure 4:
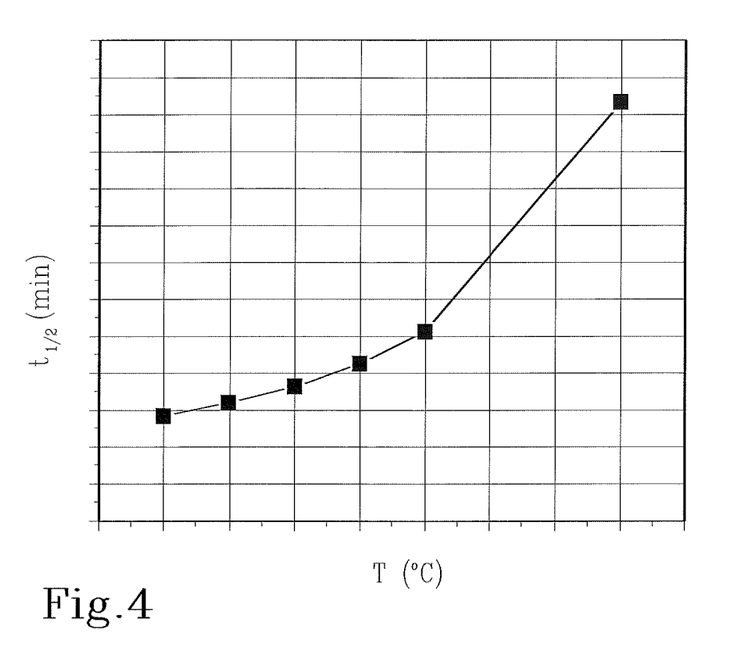
FIG. 4 is a graph showing, for the polypropylene of FIG. 2, how the time necessary to obtain a 50% crystallization of the mass of material varies depending on the temperature.

It is possible to define a crystallization half time $t\frac{1}{2}$, which is the time taken by a sample in order that half of the mass thereof becomes crystallized. FIG. 4, constructed based on the data of FIGS. 2 and 3, shows the crystallization half time $t\frac{1}{2}$ as a function of the temperature at which the sample was maintained. It is noted that, as the temperature at which the sample was maintained increases, the crystallization half time $t\frac{1}{2}$ increases as well.

In summary, the behavior of a semi-crystalline polymer during the melting and crystallization process is not uniquely defined, but is rather affected by the cooling conditions under which the polymer is cooled. In particular, the lower the temperature at which the molten polymer material is maintained, the quicker crystallization takes place.

The considerations given above are derived from studies on the behavior of semi-crystalline polymeric materials carried out under static conditions, i.e. while the sample studied was not subject to deformation. The crystallization that occurs under these conditions is called quiescent crystallization. However, in the case where a semi-crystalline polymeric material is subject to deformation, for example during extrusion, there occurs a phenomenon called flow-induced crystallization. As the material flows, anisotropic crystallites oriented in the flow direction are formed, which modifies the kinetics of crystallization of the material compared to the case in which only quiescent crystallization occurs.

When a polymeric material is cooled below the melting temperature Tf and in the meantime the polymeric material is deformed, the quiescent crystallization and the flow-induced crystallization combine, thereby resulting in an overall faster crystallization of the material.

Figure 1:
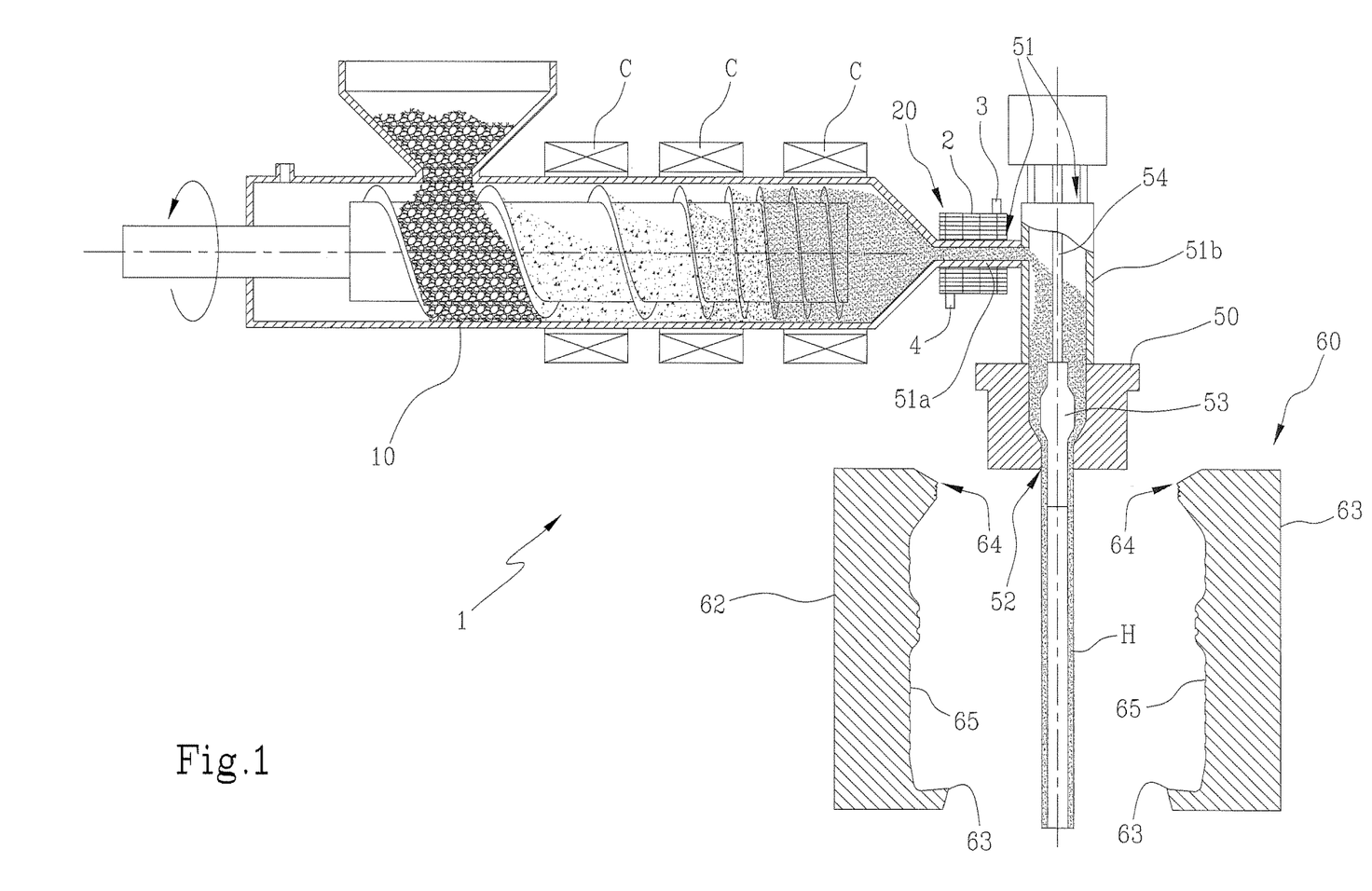
FIG. 1 shows a schematic view of a device for blow-moulding according to the present invention.

The above-described phenomena can be exploited to improve a blow moulding of a tubular body made of a semi-crystalline polymer and to improve a forming device 1 for blow moulding of a tubular body.

The device 1 comprises a melting device 10, in particular an extruder device, whose function is to melt and extrude the polymeric material. Inside the extruder device, the polymeric material is heated via heaters C, until reaching a temperature higher than the melting temperature Tf.

Downstream of the extruder device there is provided a cooling zone, configured to cool the flow of polymeric material coming from the extruder device to an operating temperature To lower than the melting temperature Tf.

The cooling area comprises a cooling device 20 structured so as to cool the flow of polymeric material coming from the extruder device to a temperature lower than the melting temperature Tf. In particular, the cooling device 20 is configured to maintain, under steady-state conditions, the temperature of the polymeric material lower than the melting temperature Tf, but higher than the crystallization temperature Tc. Of course, when the device 1 is started, the cooling device 20 is controlled in such a way as to heat the polymeric material to a temperature higher than or equal to the melting temperature Tf, so that the polymeric material that is left inside the device 1, and which can be solidified during the period of inactivity, can be re-melted and moved.

Subsequently, the cooling device 20 is controlled so as to bring the temperature of the polymeric material to a value between the melting temperature Tf and the crystallization temperature Tc, which will be maintained during normal operation.

The cooling device 20 is disposed downstream of the melting device 10. For example, the cooling device 20 comprises a heat exchanger 2. The heat exchanger 2 may be provided with a circuit for a heat exchange fluid, for example diathermic oil. In particular, the heat exchange fluid may circulate inside a chamber surrounding the main conduit along which the polymeric material flows. The chamber may be provided with an inlet 3, through which the heat exchange fluid may enter, and an outlet 4, through which the heat exchange fluid can exit the chamber. In particular, the outlet 4 can be disposed upstream of the inlet 3 with respect to a forward direction F according to which the polymeric material moves forward within the heat exchanger 2, thereby giving rise to a counter-current heat exchange or vice versa a co-current heat exchange.

Figure 5:
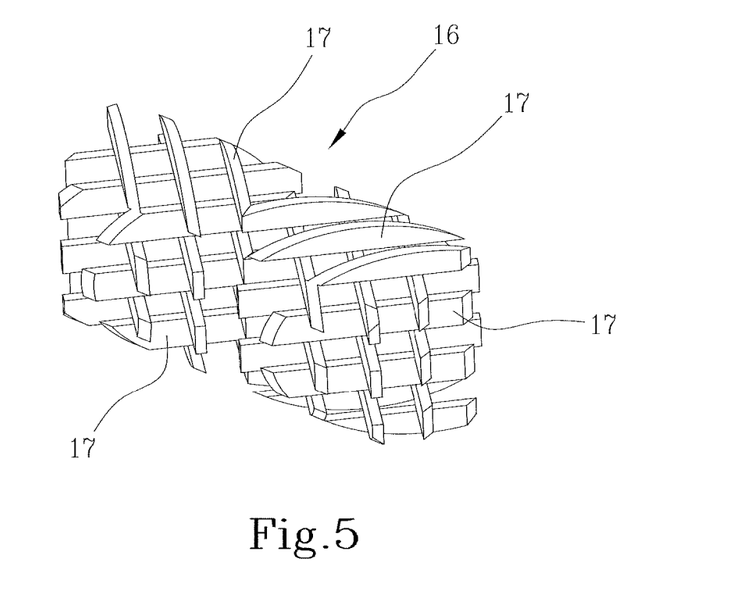
FIG. 5 shows a perspective view of a mixing element positioned inside a static mixer.

The heat exchanger 2 may comprise a static mixer. The latter may comprise a main conduit through which the polymeric material passes, and within which a mixing element 16 of the type shown in FIG. 5 is disposed.

The mixing element 16 comprises a plurality of diverting bars 17 arranged in a stationary position to homogenize the flow of polymeric material, both from a thermal point of view and, where appropriate, from a composition point of view. In particular, the diverting bars 17 may divide the main flow of polymeric material into a plurality of secondary flows that are mixed together while flowing inside the static mixer.

Alternatively, the heat exchanger 2 may include a dynamic mixer, which is provided with mixing elements that move during the operation thereof.

Further possible solutions for the cooling device 20 may comprise a cascade extruder or a satellite extruder, in particular immediately disposed downstream of the extruder device which melts and extrudes the polymeric material, or a twin screw extruder. In any case, each solution may provide a device for controlling and adjusting the temperature of the polymeric material.

The cooling device 20 could further be defined within the same melting device that melts the polymeric material, which could be provided with a terminal part configured to cool the molten polymeric material.

The device 1 further comprises an extrusion head 50, which is structured so as to extrude at least a tubular body T. The extrusion head 50 is fed by a feeding conduit 51 placed in communication with the melting device 10, so as to receive the polymeric material coming from the melting device 10. The feeding conduit 51 could be a conduit which extends straight between the melting device 10 and the extrusion head 50, or it could exhibit a more complex structure, for example the structure depicted in FIG. 1. Based on this solution, the feeding conduit 51 comprises a first stretch 51a coming from the melting device 10 and a second stretch 51b connected to the first stretch, which communicates with the extrusion head 50. In the embodiment shown, the first stretch 51a is inclined relative to the second stretch 51b; in particular, it is orthogonal to the second stretch 51b. The inclination between the two stretches 51a, 51b could however be different. The two stretches 51a, 51b could also be aligned with each other.

The cooling device 20 may be interposed between the melting device 10 and the feeding conduit 51. In the embodiment shown, the cooling device 20 is disposed along the feeding conduit 51; in particular, it is disposed along the first stretch coming from the melting device 10. In an alternative embodiment, the cooling device 20 may be disposed along the second stretch of the feeding conduit 51, for example in the form of one or more cooling circuits placed internally or externally to the second stretch of the feeding conduit 51.

The extrusion head 50 is provided with an outlet opening 52, positioned concentric with which there is a core 53 that does not occupy the entire cross section of the outlet opening 52. In a known manner, between the inner surface of the outlet opening 52 and the outer surface of the core 53, a slot with an annular cross section is defined, through which the polymeric material flows, taking on a tubular shape. Preferably, but not necessarily, the outlet opening 52 exhibits a convergent section along an outlet direction. The core 53 protrudes externally from the outlet opening 52 for a stretch of a preset length.

In an unillustrated embodiment, the cooling device 20 could be integrated into the extrusion head 50; in particular, it could include a cooling circuit for the core 53 and/or the surface of the outlet opening 52. This cooling circuit could be disposed, for example, inside the core 53, or in the extrusion head 50 so as to lightly touch the surface of the outlet opening 52. A further possible solution provides that the cooling circuit is placed outside the extrusion head 50.

In essence, the cooling device 20 might include at least one, or more than one of the cooling devices disclosed herein, i.e. the heat exchanger 2 interposed between the melting device 10 and the feeding conduit 51, or disposed along the feeding conduit 51, and/or the cooling circuit for the extrusion head 50.

Blowing means are configured to permit a fluid to be delivered into the tubular body H. In particular, a blowing conduit 54 passes through the core 53 to allow air to be delivered into the tubular body H. The blowing conduit 54 is disposed at least partially inside the feeding conduit 51, in particular inside the second stretch of the feeding conduit 51, and is configured to be connected to a source of air located outside the feeding conduit 51. Generally speaking, the extrusion head 50 is a device known in the industry, so it will not be described in further detail. The fluid delivered into the tubular body H might be a gas, such as for example compressed air, or a liquid.

During operation, the polymeric material is extruded within the extruder device 10, in which the polymeric material is heated at a higher temperature than its melting temperature Tf.

The molten polymeric material passes from the extruder device into the cooling device 20, wherein the molten polymeric material is cooled at a lower temperature than the melting temperature Tf, though higher than the crystallization temperature Tc.

Subsequently, the molten polymeric material flows into the extrusion head 50, passing through the outlet opening 52, along which it assumes a tubular shape.

Inside the device 1, it is therefore possible to define a path for the flow of polymeric material which was melted within the extruder device 10. This path passes through the cooling device 20 and reaches the extrusion head 50. In the example depicted, the path in question passes through the cooling device 20 comprising the heat exchanger 2, and then it extends along the extrusion head 50, up to the outlet opening 52 wherefrom the tubular body T exits.

The passage sections of the device 1, as well as the pressure and the speed at which the polymeric material exits the extruder device, are such that the flow of polymeric material advances from the cooling zone toward the extrusion head 50.

Figure 1A:
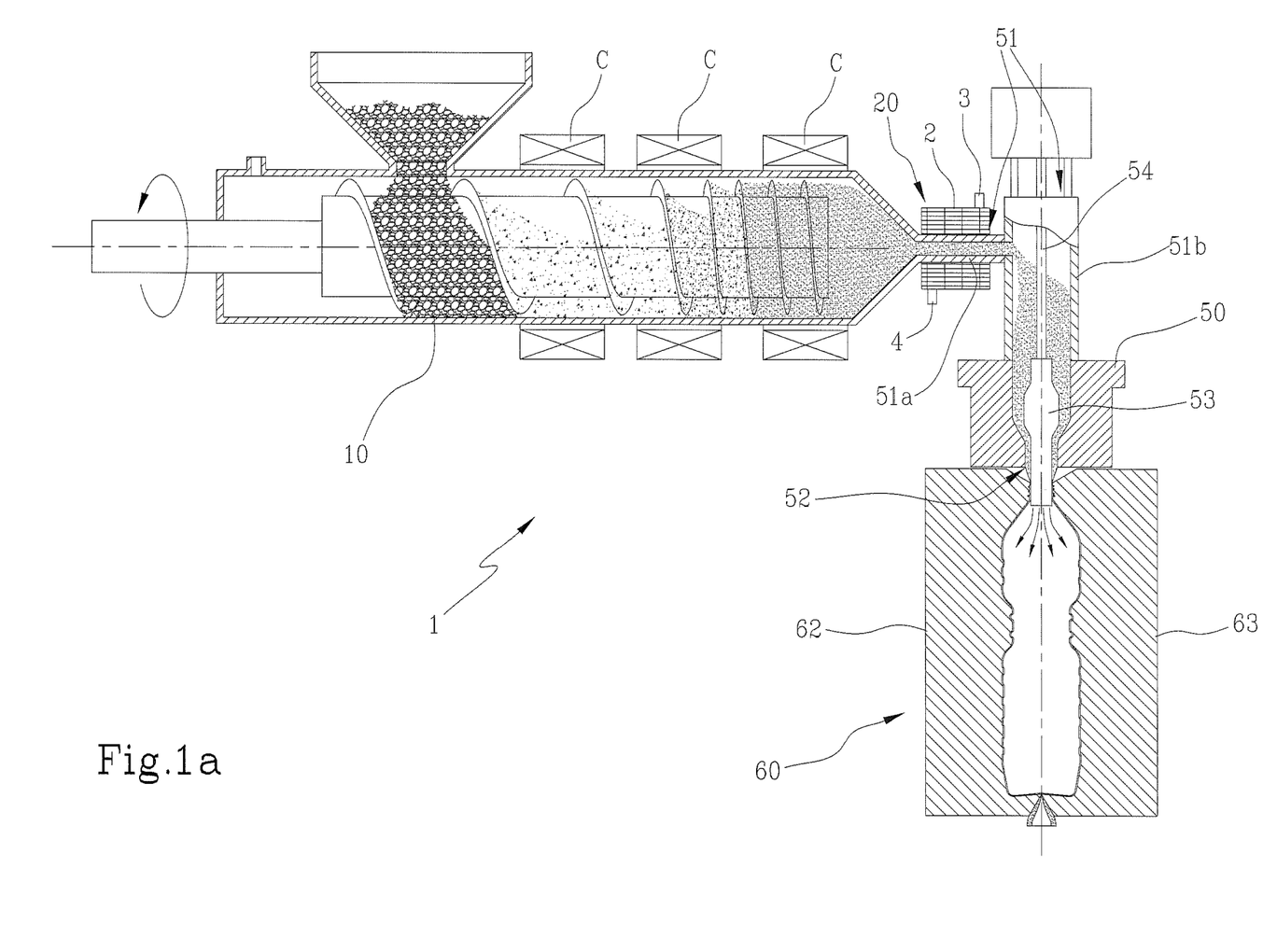
FIG. 1*a* shows the device of FIG. 1 in a subsequent operating phase.

In a known manner, the tubular body H descends from the outlet opening 52 of the extrusion head 50 for a stretch of a preset length. Once it has reached the desired length, a mould 60, divided into two half-moulds 61,62, closes around the tubular body H. The mould 60 comprises an internal cavity 65, which is defined in a closed configuration in which the two half moulds 61, 62 abut each other. In the closed configuration, the mould 60 exhibits an opening 64 in communication with the cavity 65. The opening 64 is intended to house the part of the core 53 which protrudes from the opening 52 and at least a stretch of the tubular body H disposed around the core 53. In a position opposite the opening 64, the mould is provided with two cutting edges 63, disposed on the two half-moulds 61,62 and intended to cut a bottom portion of the tubular body H. Basically, in the closed configuration of the mould 60, the two cutting edges 63 cut the bottom portion of the tubular body H, thereby closing off the tubular body H at a lower end. Under such conditions, the introduction of air through the blowing conduit 54 produces, in a known manner, the blowing of the tubular body H which adheres perfectly to the cavity 65 of the mould 60, thus assuming the shape thereof. Cutting means, not shown in detail since they are known in the field, subsequently cut off the section of the tubular body H which protrudes from the opening 64 of the mould 60.

The tubular body H is introduced into the mould at a temperature To that is lower than the melting temperature Tf of the polymeric material which makes it up, but higher than the crystallization temperature Tc at which, under static conditions, crystals begin to form.

Preferably, but not necessarily, while the polymeric material that makes up the tubular body H is being shaped inside the mould 60, its temperature may be controlled, for example, it may be maintained above or below the crystallization temperature Tc. The temperature of the tubular body H may be controlled, for example, by controlling the temperature of the forming fluid that is injected into the tubular body H or by controlling the temperature of the mould 60 or the ambient air present inside the mould 60.

The core 53 and/or the surface of the outlet opening 52 of the extrusion head 50 may be provided with respective cooling circuits, within each of which a cooling fluid circulates. Although the temperature of the polymeric material that is shaped is less than the crystallization temperature Tc, the temperature of the cooling fluid, as well as that of the cooled parts, may be lower, even significantly lower, than the crystallization temperature Tc.

The device 1 according to the present invention is particularly advantageous in a version structured so as to extrude two or more tubular bodies H1, H2 which are concentric with one another.

Figure 6:
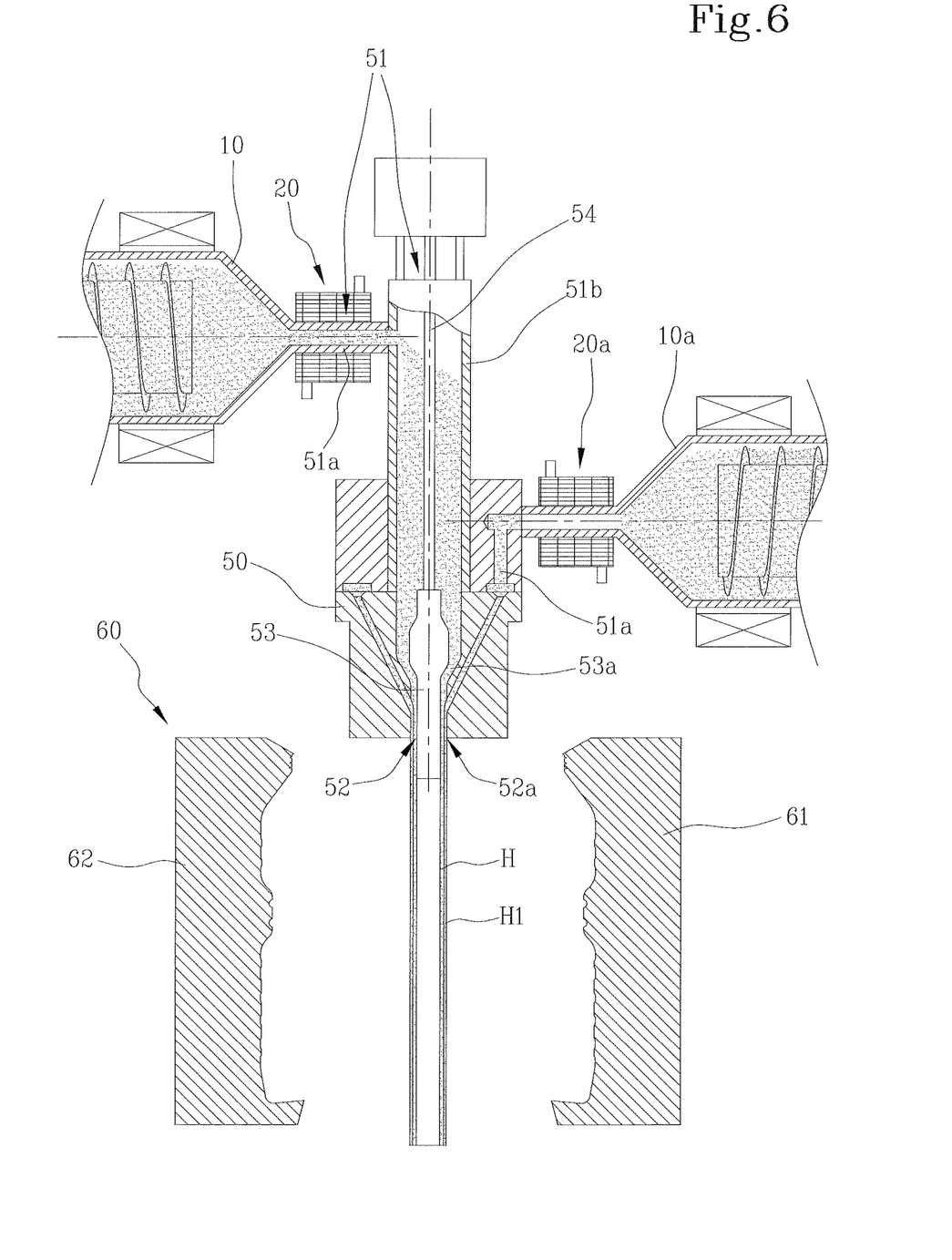
FIG. 6 schematically shows a detail of the device of FIG. 1, in a constructional variant.

In particular, the extrusion head 50 may also be configured to extrude, in a known manner, two or more tubular bodies concentric with one another, as schematically shown in FIG. 6, which shows an extrusion head 50 configured for two concentric tubular bodies. On the basis of the same principle, the head 50 may be configured, in a known manner, to extrude more than two concentric tubular bodies.

The head 50 of FIG. 6 substantially comprises a second melting device 10*a*, downstream of which a second cooling device 20*a* may be disposed. The second melting device 10*a* feeds a second feeding conduit 51*a*, placed in communication with a second outlet opening 52*a* concentric with the first outlet opening 52. In this way, two mutually concentric outlet openings 52,52*a* are defined, from which two mutually concentric tubular bodies H, H1 are extruded. The second core 53*a* for the extrusion of the outer tubular body H1 is substantially defined by a wall which delimits the first opening 52. In this way, for example, it is possible to produce two (or more) tubular bodies from different materials, where each material is cooled to a specific temperature which may be different from the temperature of the other material. During the extrusion along the extrusion head 50, the two or more tubular bodies (H, H1) are coupled together. This makes it possible, for example, to produce containers in multiple layers, where each layer has specific physicochemical characteristics. For example, it is possible to produce a layer with precise characteristics of mechanical strength coupled to a layer with precise characteristics in terms of oxygen and/or moisture barrier, and so on for a greater number of layers.

The flow rates and the temperatures of the different materials may be adjusted independently of each other, in order to obtain, for each material, the effects already described. In particular, the ability to cool the different polymeric materials independently allows a much broader and more flexible management of the viscosity of the materials themselves, compared to what occurs in existing machines, thus allowing the use of a wider range of materials and thus also enabling performance and costs to be optimized.

The core 53 and/or the surface of the first outlet opening 52 and the second outlet opening 52*a* of the extrusion head 50 may be provided with respective cooling circuits, within each of which a cooling fluid circulates. This makes it possible to accurately adjust the temperature of each material at the inlet of the mould 60.

By producing containers with the method and device described above, it is possible to obtain a substantial reduction in the cycle time compared to known methods.

It is believed that this result is attributable to the synergistic combination of two distinct phenomena.

On the one hand, inserting the tubular body H, H1 into the mould 60 at a lower temperature than the melting temperature Tf makes it possible to reduce the time required to cool the object formed as a result of blowing to a temperature value at which the object can be removed from the mould and handled without being significantly deformed.

On the other hand, subjecting the polymeric material to high flow rates upstream of the mould 60 makes it possible to increase the rate of deformation of the polymeric material and thus to accelerate the kinetics of crystallization, since the crystallization induced by the flow is added to the quiescent crystallization which would occur in static conditions.

The two effects described above combined together lead to a synergistic effect.

The crystallization induced by the flow is particularly evident in the case of materials having a high molecular weight, such as those that are usually used for blow moulding. Such materials typically have atomic mass values that are greater than 10,000 Daltons.

Processing the material at a low temperature and with high deformation rates also helps to increase the molecular orientation and, accordingly, the performance of the manufactured article.

Due to the higher crystallization and/or greater molecular orientation, the material can become more durable and it is therefore also possible to reduce the thickness of the manufactured articles and therefore the production costs thereof.

The cooling device 20, allows the temperature of the flow of polymeric material coming from the extruder device to be accurately controlled, thus helping to avoid excessive crystallization prior to the introduction thereof into the mould 60.

The present invention attains important advantages.

Firstly, cooling the polymeric material below the melting temperature and above the crystallization temperature before delivering it to the extrusion head enables the time required to cool the formed object to be reduced to a temperature at which it can be handled and therefore extracted from the mould without damage. A reduction in the cycle time is thus obtained. This reduction is all the more pronounced the lower the processing temperature which can be adopted in the extrusion head, i.e. the lower the temperature of the polymeric material while the same is being shaped in the extrusion head. In particular, the temperature of the polymeric material while it is being extruded in the extrusion head is kept above the crystallization start temperature, at which crystals begin to form in the polymeric material making up the dose under static conditions.

When high forward speeds are adopted for the flow of polymeric material, the molecular chains present in the polymeric material are brought to a highly agitated state, which makes it more difficult to keep them in a crystallized condition. Therefore, there is a decrease in the crystallization start temperature, so that the polymeric material may have relatively low temperatures while it is being shaped in the mould.

In addition, where the polymeric material is made to move forward rapidly, a flow-induced crystallization occurs in the latter, i.e. the kinetics of crystallization is accelerated, so that the formed object can more quickly reach a semi-crystalline state in which it has a sufficient stiffness so as to be extracted from the mould without undergoing any damage.

In fact, even if the polymeric material is made to move forward quickly from the cooling zone towards the mould, within the flow of polymeric material early-crystallization nuclei are however still formed which do not manage to complete their crystallization due to the high feed rate. The high feed rate ensures that such nuclei align in an orderly manner, so that they can crystallize rapidly during the blow moulding.

In other words, there is an increase in the crystallinity and/or molecular orientation of the object formed.

Since, as already previously described, increasing the feed rate of the flow of polymeric material will decrease the crystallization start temperature, it is also possible to maintain average lower temperatures in the cooling zone and up to the extrusion head. This makes it possible to more easily manipulate the polymeric material, which has a higher viscosity and therefore a lower tendency to stick. It follows that the extrusion head may be simplified.

It also possible to operate closer to the crystallization temperature without giving rise to a premature crystallization of the polymeric material.

The invention claimed is:

1. A method for forming an object made of a polymeric material, wherein the polymeric material has a melting temperature (Tf), and wherein the polymeric material has a crystallization start temperature (Tic) at which, under static conditions, crystals begin to form, the method comprising the following steps in the following order:
   a) melting the polymeric material;
   b) cooling the polymeric material to a temperature below the melting temperature (Tf) but above the crystallization start temperature (Tic);
   c) extruding the polymeric material into a tubular shaped body (H);
   d) inserting the tubular body (H), into a mould (60) having an internal cavity;
   e) closing off the tubular body (H) at a first end;
   f) blowing air into the tubular body (H) through a second end in order that the tubular body (H) adheres to the internal cavity of the mould (60); wherein the polymeric material is maintained at said temperature below the melting temperature (Tf) but above the crystallization start temperature (Tic) from (A) when it is cooled to said temperature below the melting temperature (Tf) but above the crystallization start temperature (Tic) in step b), to (B) through when the tubular body (H) is inserted into the mould (60) in step d).

2. The method according to claim 1, comprising the following steps:
   melting at least a second polymeric material;
   extruding the second polymeric material into a second tubular body (H1) concentric with the tubular body (H);
   inserting the tubular body (H) and the second tubular body (H1) into a mould (60) having an internal cavity;
   closing off the second tubular body (H1) at a first end;
   blowing air into the tubular bodies (H, H1) through the second end of the tubular body (H) or a second end of the second tubular body (H1), in order that the tubular bodies (H, H1) adhere to the inner cavity of the mould (60).

3. The method according to claim 2, wherein the second tubular body (H1) is at a temperature below the melting temperature (Tf2) of the second polymeric material but above the crystallization start temperature (Tic2) of the second polymeric material when the second tubular body (H1) is inserted into the mould (60) having an internal cavity.

4. The method accordingly to claim 3, wherein the polymeric material and the second polymeric material are different materials having different melting temperatures and different crystallization start temperatures.

5. The method according to claim 1, wherein the polymeric material has an atomic mass value greater than 10,000 Daltons.

6. The method according to claim 1, wherein the polymeric material is a semi-crystalline polymeric material.

7. The method according to claim 1, wherein the polymeric material is selected from the group consisting of polypropylene, high-density polyethylene and polyethylene terephthalate.

8. The method accordingly to claim 1, wherein the polymeric material is selected from the group consisting of polypropylene and high-density polyethylene.

9. The method according to claim 1, wherein the polymeric material is selected from the group consisting of high-density polyethylene and polyethylene terephthalate.

* * * * *